(12) United States Patent  
Watfa

(10) Patent No.: US 11,844,011 B2  
(45) Date of Patent: *Dec. 12, 2023

(54) METHOD AND APPARATUS FOR DEFINING UE BEHAVIOR IN RESTRICTED SERVICE AREA

(71) Applicant: Samsung Electronics Co., Ltd., Suwon-si (KR)

(72) Inventor: Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,145

(22) Filed: Jan. 11, 2023

(65) Prior Publication Data

US 2023/0142334 A1 May 11, 2023

Related U.S. Application Data

(63) Continuation of application No. 17/176,635, filed on Feb. 16, 2021, now Pat. No. 11,558,807.

(30) Foreign Application Priority Data

Feb. 16, 2020 (GB) .................................... 2002111  
Jan. 20, 2021 (GB) .................................... 2100749

(51) Int. Cl.
    *H04W 48/04* (2009.01)
    *H04W 76/25* (2018.01)
    *H04W 76/27* (2018.01)

(52) U.S. Cl.
    CPC .......... *H04W 48/04* (2013.01); *H04W 76/25* (2018.02); *H04W 76/27* (2018.02)

(58) Field of Classification Search
    CPC ..... H04W 48/04; H04W 76/25; H04W 76/27; H04W 48/06; H04W 76/00; H04W 28/02;
    (Continued)

(56) References Cited

U.S. PATENT DOCUMENTS

2006/0291404 A1* 12/2006 Thubert .................. H04L 45/00  
                                                       370/254  
2007/0091811 A1*  4/2007 Thubert .................. H04L 45/20  
                                                       370/252

(Continued)

FOREIGN PATENT DOCUMENTS

WO    2017/170123 A1    10/2017  
WO    2018/226072 A2    12/2018

OTHER PUBLICATIONS

3rd Generation Partnership Project; Technical Specification Group Services and System Aspects; System architecture for the 5G System (5GS); Stage 2, (Release 16), 3GPP TS 24.501 V16.3.0, Dec. 20, 2019.

(Continued)

*Primary Examiner* — Mewale A Ambaye  
(74) *Attorney, Agent, or Firm* — Jefferson IP Law, LLP

(57) ABSTRACT

The disclosure relates to a communication method and a system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as a smart home, a smart building, a smart city, a smart car, a connected car, healthcare, digital education, a smart retail, security and safety services. A method for a user equipment (UE) in a network is provided. The method includes determining one or more of a mode of the UE, a type of data required, and a service requested, and setting a UE behavior for initiating a NAS (Continued)

procedure based on one or more of the mode of the UE, the type of data required, and the service requested.

20 Claims, 4 Drawing Sheets

(58) Field of Classification Search
CPC ......... H04W 80/10; H04W 4/70; H04W 4/14; H04W 4/02; H04L 67/14
See application file for complete search history.

(56) References Cited

U.S. PATENT DOCUMENTS

| | | | |
|---|---|---|---|
| 2009/0285124 A1* | 11/2009 | Aguirre | H04W 40/24 370/255 |
| 2018/0176948 A1* | 6/2018 | Islam | H04W 74/0833 |
| 2018/0359783 A1* | 12/2018 | Abedini | H04W 76/10 |
| 2018/0368125 A1* | 12/2018 | Cezanne | H04W 72/046 |
| 2019/0037441 A1 | 1/2019 | Liu et al. | |
| 2019/0090107 A1 | 3/2019 | Kim et al. | |
| 2019/0342800 A1 | 11/2019 | Sirotkin et al. | |
| 2019/0394668 A1 | 12/2019 | Shaheen et al. | |
| 2020/0396788 A1 | 12/2020 | Tiwari et al. | |
| 2021/0084528 A1 | 3/2021 | Kim et al. | |
| 2021/0337621 A1 | 10/2021 | Dhanapal et al. | |

OTHER PUBLICATIONS

3rd Generation Partnership Project; Technical Specification Group Services and System Aspects; System architecture for the 5G System (5GS); Stage 2, (Release 16), 3GPP TS 23.501 V16.3.0, Dec. 22, 2019.

3GPP; TSG CT; Non-Access-Stratum (NAS) protocol for5G System (5GS); Stage 3 (Release 16), 3GPP TS 24.501 V16.3.0, Dec. 20, 2019.

Blackberry UK Ltd., Correct EPS SRVCC support indication when registering with 5GS, 3GPP TSG-CT WG1 Meeting #121bis-e, C1ah-200012, Jan. 11, 2020.

Ericsson, Clarification and abnormal case for NAS message container IE contents, 3GPP TSG-CT WG1 Meeting #121bis-e, C1ah-200102, Jan. 13, 2020.

International Search Report dated May 27, 2021, issued in International Application No. PCT/KR2021/001951.

Great Britain Examination Report dated Oct. 19, 2022, issued in Great Britain Application No. GB2100749.7.

Extended European Search Report dated Jun. 19, 2023, issued in a European Patent Application No. 21753950.1.

European Office Action dated Sep. 18, 2023, issued in a European Patent Application No. 21753950.1.

* cited by examiner

METHOD AND APPARATUS FOR DEFINING UE BEHAVIOR IN RESTRICTED SERVICE AREA

CROSS-REFERENCE TO RELATED APPLICATION(S)

This application is a continuation application of prior application Ser. No. 17/176,635, filed on Feb. 16, 2021, which has issued as U.S. Pat. No. 11,558,807 on Jan. 17, 2023 and is based on and claims priority under 35 U.S.C. § 119(a) of a United Kingdom patent application number 2002111.9, filed on Feb. 16, 2020, in the United Kingdom Patent Office, and of a United Kingdom patent application number 2100749.7, filed on Jan. 20, 2021, in the United Kingdom Patent Office, the disclosure of each of which is incorporated by reference herein in its entirety.

BACKGROUND

1. Field

The disclosure relates to methods, apparatuses, and systems for defining user equipment (UE) behavior in restricted service areas of a network. More particularly, the disclosure relates to methods, apparatuses, and systems for defining Cellular Internet of Things (CIoT) UE behavior in restricted service areas in 3$^{rd}$ generation partnership project (3GPP) 5$^{th}$ generation system (5GS).

2. Description of Related Art

To meet the demand for wireless data traffic having increased since deployment of 4$^{th}$ generation (4G) communication systems, efforts have been made to develop an improved 5G or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Service area restrictions define the rules to restrict access to services and where applicable the exceptions to these rules. However, services for CIoT 5GS optimization were not considered for service area restrictions. Hence, how the UE behaves when CIoT 5GS optimizations are used and when the UE is in a restricted service area was not at all defined.

Aspects of the disclosure are to address at least the above-mentioned problems and/or disadvantages and to provide at least the advantages described below. Accordingly, an aspect of the disclosure is to provide an apparatus and method for defining UE behavior when CIoT optimization is being used and the UE is in a restricted service area.

Another aspect of the disclosure is to set conditions for transmitting different types of non-access stratum (NAS) messages based on the type of data or service required when the UE is in a restricted service area.

In accordance with an aspect of the disclosure, a method of a user equipment (UE) in a network, wherein the UE is using control plane cellular internet of things (CIoT) 5G system (5GS) optimization and is in a restricted service area is provided. The method includes identifying one or more of a mode of the UE, a type of data required, and a service requested, and setting a UE behavior for initiating a NAS procedure based on the one or more of the mode of the UE, the type of data required, and the service requested.

In accordance with another aspect of the disclosure, a UE using control plane CIoT 5GS optimization and being in a restricted service area is provided. The UE including a transceiver, and at least one processor coupled with the transceiver and configured to identify one or more of a mode of the UE, a type of data required, and a service requested, and set a UE behavior for initiating a NAS procedure based on the one or more of the mode of the UE, the type of data required, and the service requested.

In accordance with another aspect of the disclosure, a network comprising a UE, wherein the UE is using control plane CIoT 5GS optimization and is in a restricted service area is provided. The network including a transceiver, and at least one processor coupled with the transceiver and configured to identify one or more of a mode of the UE, a type of data required, and a service requested, and set a UE behavior for initiating a NAS procedure based on the one or more of the mode of the UE, the type of data required, and the service requested.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
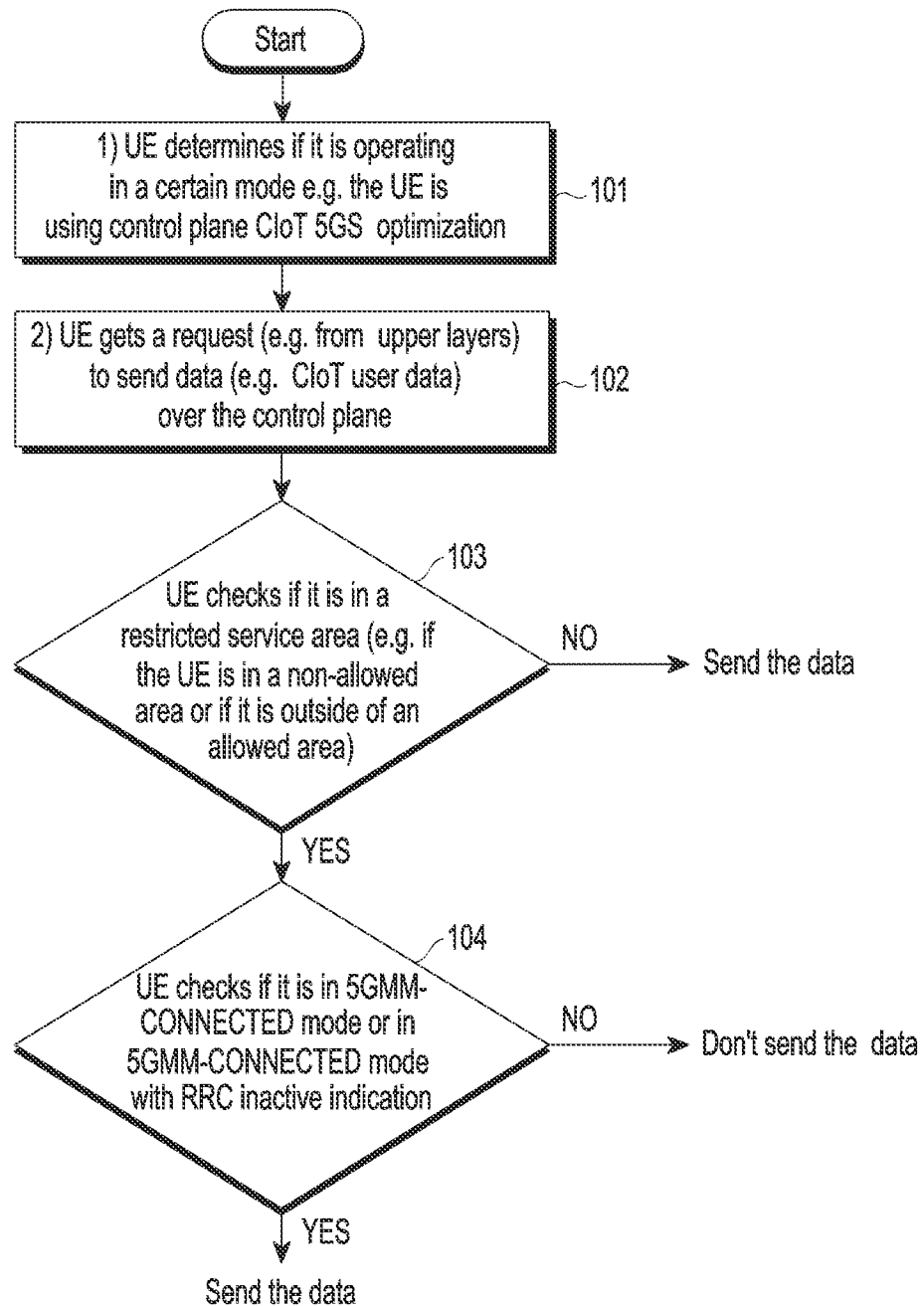
FIG. 1 is a flowchart illustrating setting of a UE behavior for initiating a non-access stratum (NAS) procedure according to an embodiment of the disclosure.

The following description with reference to the accompanying drawings is provided to assist in a comprehensive understanding of the various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the description and claims of this specification, the words "comprise", "include" and "contain" and variations of the words, for example "comprising" and "comprises", means "including but not limited to", and is not intended to (and does not) exclude other features, elements, components, integers, processes, operations, functions, characteristics, properties and/or groups thereof.

Throughout the description and claims of this specification, language in the general form of "X for Y" (where Y is some action, process, operation, function, or activity and X is some means for carrying out that action, process, operation, function, or activity) encompasses means X adapted, configured or arranged specifically, but not necessarily exclusively, to do Y.

Features, elements, components, integers, processes, operations, functions, characteristics, properties and/or groups thereof described or disclosed in conjunction with a particular aspect, embodiment, example or claim of the disclosure are to be understood to be applicable to any other aspect, embodiment, example or claim described herein unless incompatible therewith.

Herein, the following documents are referenced:
[1] 3GPP TS 24.501 V16.3.0
[2] 3GPP TS 23.501 V16.3.0

Various acronyms and abbreviations used herein are defined at the end of this description.

The above documents disclose various operations and procedures, including the following.

Overview of Service Area Restriction in 5GS

5GS defines the concept of service area restrictions which determine where, i.e., which tracking areas (TAs) or TA identities (TAIs) the UE can request a service. The service area can either be defined to be of type "allowed tracking areas" or "non-allowed tracking areas". The UE can request normal service when it is in TAs that are considered to be "allowed tracking areas" or when it is not in TAs that are considered to be "non-allowed tracking areas", and vice versa as described below from section 5.3.5 of TS 24.501 [1]:

The service area restrictions consist of tracking areas forming either an allowed area, or a non-allowed area. The tracking areas belong to either the registered Public Land Mobile Network (PLMN) or its equivalent PLMNs in the registration area. The allowed area can contain up to 16 tracking areas or include all tracking areas in the registered PLMN and its equivalent PLMN(s) in the registration area. The non-allowed area can contain up to 16 tracking areas. The network conveys the service area restrictions to the UE by including either an allowed area, or a non-allowed area, but not both, in the Service area list IE of a REGISTRATION ACCEPT message or a CONFIGURATION UPDATE COMMAND message.

If the network does not convey the service area restrictions to the UE in the Service area list IE of a REGISTRATION ACCEPT message, the UE shall treat all tracking areas in the registered PLMN and its equivalent PLMN(s) in the registration area as allowed area and delete the stored list of "allowed tracking areas" or the stored list of "non-allowed tracking areas"

When the UE receives a Service area list IE with an allowed area indication during a registration procedure or a generic UE configuration update procedure:

a) if the "Type of list" included in the Service area list IE does not indicate "all TAIs belonging to the PLMNs in the registration area are allowed area", the UE shall delete the old list of "allowed tracking areas" and store the tracking areas in the allowed area as the list of "allowed tracking areas". If the UE has a stored list of "non-allowed tracking areas", the UE shall delete that list; or b) if the "Type of list" included in the Service area list IE indicates "all TAIs belonging to the PLMNs in the registration area are allowed area", the UE shall treat all tracking areas in the registered PLMN and its equivalent PLMN(s) as allowed area and delete the stored list of "allowed tracking areas" or the stored list of "non-allowed tracking areas".

When the UE receives a Service area list IE with a non-allowed area indication during a registration procedure or a generic UE configuration update procedure, the UE shall delete the old list of "non-allowed tracking areas" and store the tracking areas in the non-allowed area as the list of "non-allowed tracking areas". If the UE has a stored list of "allowed tracking areas", the UE shall delete that list.

If the UE is successfully registered to a PLMN and has a stored list of "allowed tracking areas":

a) while camped on a cell whose TAI is in the list of "allowed tracking areas", the UE shall stay or enter the state 5GMM-REGISTERED.NORMAL-SERVICE and is allowed to initiate any 5GMM and 5GSM procedures; and b) while camped on a cell which is in the registered PLMN or a PLMN from the list of equivalent PLMNs and whose TAI is in the registration area and is not in the list of "allowed tracking areas", the UE shall enter the state 5GMM-REGISTERED.NON-ALLOWED-SERVICE, and:

1) if the UE is in 5GMM-IDLE mode over 3GPP access, the UE:

i) shall not perform the registration procedure for mobility and periodic registration update with Uplink data status IE except for emergency services or for high priority access; and ii) shall not initiate a service request procedure except for emergency services, high priority access, responding to paging or notification or indicating a change of 3GPP packet switched (PS) data off UE status; and 2) if the UE is in 5GMM-CONNECTED mode or 5GMM-CONNECTED mode with radio resource control (RRC) inactive indication over 3GPP access, the UE:

i) shall not perform the registration procedure for mobility and periodic registration update with Uplink data status IE except for emergency services or for high priority access; and ii) shall not initiate a service request procedure except for emergency services, high priority access or for responding to paging or notification over non-3GPP access; and iii) shall not initiate a 5GSM procedure except for emergency services, high priority access or indicating a change of 3GPP PS data off UE status.

If the UE is successfully registered to a PLMN and has a stored list of "non-allowed tracking areas":

a) while camped on a cell which is in the registered PLMN or a PLMN from the list of equivalent PLMNs and whose TAI is not in the list of "non-allowed tracking areas", the UE shall stay or enter the state 5GMM-REGISTERED-.NORMAL-SERVICE and is allowed to initiate any 5GMM and 5GSM procedures; and b) while camped on a cell whose TAI is in the list of "non-allowed tracking areas", the UE shall enter the state 5GMM-REGISTERED.NON-ALLOWED-SERVICE, and:

1) if the UE is in 5GMM-IDLE mode over 3GPP access, the UE:

i) shall not perform the registration procedure for mobility and periodic registration update with Uplink data status IE except for emergency services or for high priority access; and ii) shall not initiate a service request procedure except for emergency services, high priority access, responding to paging or notification or indicating a change of 3GPP PS data off UE status; and 2) if the UE is in 5GMM-CONNECTED mode or 5GMM-CONNECTED mode with RRC inactive indication over 3GPP access, the UE:

i) shall not perform the registration procedure for mobility and registration update with the Uplink data status IE except for emergency services or for high priority access; and ii) shall not initiate a service request procedure except for emergency services, high priority access or for responding to paging or notification over non-3GPP access; and iii) shall not initiate a 5GSM procedure except for emergency services, high priority access or indicating a change of 3GPP PS data off UE status.

The list of "allowed tracking areas", as well as the list of "non-allowed tracking areas" shall be erased when:

a) the UE is switched off; and b) the UICC containing the universal subscriber identity module (USIM) is removed.

When a tracking area is added to the list of "5GS forbidden tracking areas for roaming" or to the list of "5GS forbidden tracking areas for regional provision of service" as specified in the subclauses 5.5.1.2.5 or 5.5.1.3.5, the tracking area shall be removed from the list of "allowed tracking areas" if the tracking area is already present in the list of "allowed tracking areas" and from the list of "non-allowed tracking areas" if the tracking area is already present in the list of "non-allowed tracking areas".

As can be seen from the above, only certain services are allowed when the UE is in TAs that are considered to be "non-allowed tracking areas" e.g., emergency services, or reporting of 3GPP PS data off.

Overview of Small Data Rate Control for CIoT

As part of 5G CIoT, the concept of small data rate control was introduced and it enables the network to limit the maximum number of data packets that can be sent by a CIoT UE (i.e., UE in narrowband (NB)-N1 mode or wideband (WB)-N1 mode) in a certain time interval. Small data rate control also defines the total number of so called exception data that the UE can send in a certain time interval. Exception data is a form of high priority data hence the term "exception data" and is used for exception data reporting. It should be noted that a separate RRC establishment cause is used to differentiate connections that are initiated for exception data reporting for UEs in NB-N1 mode as described in section 5.31.14.3 of TS 23.501 [2]. The small data rate control parameters are provided to the UE during protocol data unit (PDU) session establishment in the (extended) protocol configuration options (e)PCO parameter.

The home session management function ((H-)SMF) may consider, e.g., operator policy, subscription, data network name (DNN), single network slice selection assistance information (S-NSSAI), radio access technology (RAT) type or the like, to determine whether to apply Small Data Rate Control or not. The (H-)SMF can send a Small Data Uplink Rate Control command to the UE using the PCO information element. The (H-)SMF informs the user plane function (UPF) or network exposure function (NEF) of any Small Data Rate Control that shall be enforced.

The Small Data Uplink Rate Control applies to data PDUs sent on that PDU Session by either Data Radio Bearers or Signaling Radio Bearers (NAS Data PDUs).

The rate control information is separate for uplink and downlink and in the form of:
- an integer 'number of packets per time unit', and
- an integer 'number of additional allowed exception report packets per time unit' once the rate control limit has been reached.

The UE shall comply with this uplink rate control instruction. If the UE exceeds the uplink 'number of packets per time unit', the UE may still send uplink exception reports if allowed and the 'number of additional allowed exception reports per time unit' has not been exceeded. The UE shall consider this rate control instruction as valid until it receives a new one from (H-)SMF.

When a PDU Session is first established the (H-)SMF may provide the configured Small Data Rate Control parameters to the UE and UPF or NEF.

When the PDU Session is released, the Small Data Rate Control Status (including the number of packets still allowed in the given time unit, the number of additional exception reports still allowed in the given time unit and the termination time of the current Small Data Rate Control validity period) may be stored in the access and mobility management function (AMF) so that it can be retrieved for a subsequent re-establishment of a new PDU Session.

At subsequent establishment of a new PDU Session, the (H-)SMF may receive the previously stored Small Data Rate Control Status and if the validity period has not expired, it provides the parameters to the UE in the PCO and to the UPF/NEF as the initially applied parameters, in addition to the configured Small Data Rate Control parameters. If the initially applied parameters are provided, the UE and UPF or NEF use the configured Small Data Rate Control parameters once the initially applied Small Data Rate Control validity period expires.

NOTE 2: The storage of the Small Data Rate Control Status information for very long time intervals can be implementation specific.

Small Data rate control is based on a 'maximum allowed rate' per direction. If (H-)SMF provided the 'number of additional allowed exception report packets per time unit' to the UE, then the 'maximum allowed rate' is equal to the 'number of packets per time unit' plus the 'number of additional allowed exception report packets per time unit'. Otherwise, the 'maximum allowed rate' is equal to the 'number of packets per time unit'.

The UPF or NEF may enforce the uplink rate by discarding or delaying packets that exceed the 'maximum allowed rate'. The UPF or NEF shall enforce the downlink rate by discarding or delaying packets that exceed the downlink part of the 'maximum allowed rate'.

NOTE 3: It is assumed that the Serving PLMN Rate is sufficiently high to not interfere with the Small Data Rate Control as the Small Data Rate Control, if used, is assumed to allow fewer messages. NAS PDUs related to exception reports are not subject to the Serving PLMN Rate Control.

For NB-IoT the AMF maintains an "MO Exception Data Counter" which is incremented when RRC establishment cause "MO exception data" is received from 5G RAN (NG-RAN). The AMF reports the "MO Exception Data Counter" to all (H-) SMFs which have PDU Sessions that are subject to Small Data Rate Control and informs the SMF when UE is accessing with "MO exception data" RRC establishment cause. Upon receiving such indication of "MO exception data" RRC establishment cause from the AMF, each (H-)SMF reports the "MO Exception Data Counter" to each UPF and NEF for each PDU Session to which Small Data Rate Control applies. After receiving the "MO Exception Data Counter", each NEF and UPF consider PDUs transferred during an RRC Connection established for "MO Exception data" to be exception data for Small Data Rate Control purposes. The UPF indicates each use of the RRC establishment cause "MO Exception Data" by the related counter on its charging data record (CDR).

NOTE 4: Since Exception Data PDUs and normal priority PDUs cannot be distinguished within an RRC connection, the AMF is only counting the number of RRC Connection establishments with "MO Exception data" priority.

If the UE moves to evolved packet core (EPC) then the UE and the user plane component of PGW (PGW-U)+UPF store the current Small Data Rate Control Status for all PDU Sessions that are not released. If the UE moves back to 5G Core (5GC) the stored Small Data Rate Control Status is restored and continues to apply to PDU Session(s) that are moved from EPC to 5GC, taking into account remaining validity period of the stored Small Data Rate Control Status. When the UE moves to EPC the Small Data Rate Control Status for all PDU Session(s) may also be stored in the AMF if the PDU Session is released while the UE is connected to EPC and re-established when the UE moves to 5GC. The time to store the Small Data Rate Control Status information is implementation specific.

Finally, it should be noted that small data rate control applies to both CIoT data that is sent over the user plane or the control plane as stated in the quoted text above.

The above information is presented as background information only to assist with an understanding of the disclosure. No determination has been made, and no assertion is made, as to whether any of the above might be applicable as prior art with regard to the disclosure.

Certain examples of the disclosure provide methods, apparatus and systems for defining UE behavior in restricted service areas of a network. For example, certain examples of the disclosure provide methods, apparatus and systems for defining CIoT UE behavior in restricted service areas in 3GPP 5GS. However, the skilled person will appreciate that the disclosure is not limited to these examples, and may be applied in any suitable system or standard, for example one or more existing and/or future generation wireless communication systems or standards.

The following examples are applicable to, and use terminology associated with, 3GPP 5G. However, the skilled person will appreciate that the techniques disclosed herein are not limited to 3GPP 5G. For example, the functionality of the various network entities and messages disclosed herein may be applied to corresponding or equivalent entities and messages in other communication systems or standards. Corresponding or equivalent entities and messages may be regarded as entities and messages that perform the same or similar role within the network. The skilled person will also appreciate that the transmission of information between network entities is not limited to the specific form, type or order of messages described in relation to the examples disclosed herein.

A particular network entity may be implemented as a network element on a dedicated hardware, as a software instance running on a dedicated hardware, and/or as a virtualized function instantiated on an appropriate platform, e.g., on a cloud infrastructure.

The skilled person will appreciate that the disclosure is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements or entities may be added to the examples disclosed herein.

One or more non-essential elements or entities may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed and/or the order in which messages are transmitted may be modified, if possible, in alternative examples.

Certain examples of the disclosure may be provided in the form of an apparatus/device/network entity configured to perform one or more defined network functions and/or a method therefor. Certain examples of the disclosure may be provided in the form of a system comprising one or more such apparatuses/devices/network entities, and/or a method therefor.

In the techniques of the related art, for example those referred to above, there occur the following problems.
Undefined CIoT UE Behavior when in a Restricted Service Area Only specific services are to be allowed when the UE is in a restricted service area i.e., when the TAs in the Service area list IE indicate are set to "non-allowed tracking areas". However, the current specification does not address CIoT UEs that may be in a restricted service area either when the UE's mode is 5GMM-CONNECTED mode, or 5GMM-CONNECTED mode with RRC inactive indication, or 5GMM-IDLE mode. This is especially problematic for UEs that use control plane CIoT 5GS optimization for which the data is sent over the control plane. Note that such a UE will use the uplink (UL) NAS TRANSPORT message to send data over NAS (referred to as CIoT user data) when the UE is in 5GMM-CONNECTED mode. However, normally in a restricted service area, the UE is not allowed to send data unless it is for emergency services, or if the UE is a high priority access UE. As such, the UE's behavior when using CIoT 5GS optimization should be defined for the cases when the UE is in restricted service areas.

Moreover, this behavior is not defined for UEs that need to send exception data reports which are considered to be of higher priority data than "normal" data.

Furthermore, the current specification would prohibit the establishment of a PDU session for exception data reporting as the UE, per the quoted text above, "shall not initiate a 5GSM procedure except for emergency services, high priority access or indicating a change of 3GPP PS data off UE status". This behavior does is not suitable for exception data reporting.

Certain examples of the disclosure address the above problems. For example, certain examples of the disclosure define UE behavior when CIoT optimization is being used and the UE is in a restricted service area. Certain examples of the disclosure set conditions for sending different types of NAS messages based on the type of data or service required when the UE is in a restricted service area.

Accordingly, certain examples of the disclosure may apply one or more of the following techniques.

Certain examples of the disclosure provide a method, for a UE in a network, wherein the UE is using control plane CIoT 5GS optimization and is in a restricted service area, the method comprising: determining one or more of a mode of the UE, a type of data required, and a service requested; and setting a UE behavior for initiating a NAS procedure based on one or more of the mode of the UE, the type of data required, and the service requested.

In certain examples of the disclosure, the UE behavior may comprise one or more of: an allowed behavior; a prohibited behavior; and a required behavior.

In certain examples of the disclosure, the UE behavior comprises UE behavior according to one or more of the examples disclosed herein.

Certain examples of the disclosure provide a UE configured to operate according to a method according to any of the examples disclosed herein.

In certain examples, setting the behavior may comprise:
if the UE is in 5GMM-IDLE mode with suspend indication (e.g., over 3GPP access),
the UE shall not request lower layers to resume a suspended connection,
except for performing one or more predefined types of operation.

In certain examples, the one or more predefined types of operation may comprise sending an UL NAS TRANSPORT message comprising one or more predefined types of data.

In certain examples, the one or more predefined types of operation may comprise one or more of an SMS and a sending a location service message.

In certain examples, the one or more predefined types of operation may comprise one or more of responding to notification received (e.g., over non-3GPP access); sending an SOR transport container; sending a UE policy container; and sending a UE parameters update transport container.

In certain examples, setting the behavior may comprise:
if the UE is in 5GMM-CONNECTED mode or 5GMM-CONNECTED mode with RRC inactive indication (e.g., over 3GPP access),
the UE shall not perform a NAS transport procedure,
except for the sending of a UL NAS TRANSPORT message comprising one or more predefined types of data.

In certain examples, the data may comprise one or more of an SMS, an LPP message, a location services message, an SOR transport container, a UE policy container, a UE parameters update transport container, and a CIoT user data container.

In certain examples, setting the behavior may comprise:
if the UE is in 5GMM CONNECTED mode with RRC inactive indication (e.g., over 3GPP access),
the UE shall not request lower layers to resume a suspended connection,
except for performing one or more predefined types of operation.

In certain examples, the one or more predefined types of operation may comprise one or more of: emergency services, high priority access, and responding to paging or responding to notification received (e.g., over non-3GPP access).

In certain examples, setting the behavior may comprise:
if the UE is in 5GMM-CONNECTED mode or in 5GMM-CONNECTED mode with RRC inactive indication,
the UE should not send an UL NAS TRANSPORT with the Payload type set to "CIoT user data container",
unless the UE receives a DL NAS TRANSPORT message with the Payload type set to "CIoT user data container".

In certain examples, setting the behavior may comprise:
if the UE transitioned to 5GMM-CONNECTED mode with a Service Request message, or a Registration Request message, in response to paging,
the UE can send an UL NAS TRANSPORT message with the Payload type set to "CIoT user data container".

In certain examples, setting the behavior may comprise:
if the UE is in 5GMM-CONNECTED mode and in NB-N1 mode, and
if the UE needs to send CIoT user data for exception data reporting,
the UE should send the UL NAS TRANSPORT message with the Payload type set to "CIoT user data container".

In certain examples, setting the behavior may comprise:
if the UE is in 5GMM-CONNECTED mode and in NB-N1 mode, and
if the RRC connection was established with the RRC establishment cause set to mo-ExceptionData,
the UE can send the UL NAS TRANSPORT message with the Payload type set to "CIoT user data container".

In certain examples, setting the behavior may comprise:
if the UE is in 5GMM-CONNECTED mode and
if the UE establishes a PDU session for the purpose of exception data reporting,
the UE should send a PDU Session Establishment Request message in the UL NAS TRANSPORT message.

In certain examples,
if the maximum number of active user-plane resources is reached and the upper layers of the UE request user-plane resources for exception data reporting,
the UE should (be allowed to) send a PDU Session Release Request message in the UL NAS TRANSPORT message to release a PDU session in order to establish another PDU session for exception data reporting.

In certain examples, setting the behavior may comprise:
if the UE is in 5GMM-IDLE mode,
the UE is not allowed to initiate a service request procedure,
except if the UE needs to establish a PDU session for exception data reporting, or to request user-plane resource establishment for sending data for exception data reporting, or to send exception data reporting using the Control Plane Service Request message.

In certain examples, setting the behavior may comprise:
if the UE is in 5GMM-CONNECTED mode,
the UE is not allowed to initiate a service request procedure,
except if the UE needs to request user-plane resource establishment for sending data for exception data reporting.

In certain examples, setting the behavior may comprise:
if the UE is in 5GMM-IDLE mode with suspend indication,
the UE should not request the lower layers to resume the connection,
except if the UE needs to send exception data for exception data reporting, or if the UE needs to send a PDU Session Establishment Request message for sending exception data for exception data reporting, or if the UE needs to release a PDU session (after the maximum number of active user-plane resources is reached and the upper layers of the UE request user-plane resources for exception data reporting) in order to establish another PDU session for exception data reporting.

Certain examples of the disclosure provide a network comprising a UE according to any of the examples disclosed herein.

Certain examples of the disclosure provide a computer program comprising instructions which, when the program is executed by a computer or processor, cause the computer or processor to carry out a method according to any of the examples disclosed herein.

Certain examples of the disclosure provide a computer or processor-readable data carrier having stored thereon a computer program according to any of the examples disclosed herein.

UE Behavior with Respect to Usage of CIoT Optimization when in a Restricted Service Area This section proposes the UE behavior when the UE is using CIoT optimizations and is in a restricted service area. Note that "restricted service area" can mean that the UE is in a TA that is set to "non-allowed tracking area" in the Service area list IE, or the UE is not in a TA that is set to be "allowed tracking area" in the Service area list IE. The UE behavior should be as follows:

The default behavior should be that the UE, which is using control plane CIoT 5GS optimization, that is in 5GMM-CONNECTED mode, or in 5GMM-CONNECTED mode with RRC inactive indication should not send an UL NAS TRANSPORT with the Payload type set to "CIoT user data container". However, the if the UE receives a DL NAS TRANSPORT message with the Payload type set to "CIoT user data container", the UE is allowed to send an UL NAS TRANSPORT message with the Payload type set to "CIoT user data container". Alternatively, if the UE had transitioned to 5GMM-CONNECTED mode with a Service Request message, or a Registration Request message, in response to paging then the UE can send an UL NAS TRANSPORT message with the Payload type set to "CIoT user data container".

If the UE is an NB-N1 mode UE and is in 5GMM-CONNECTED mode and the UE needs to send CIoT user data for exception data reporting, the UE should send the UL NAS TRANSPORT message with the Payload type set to "CIoT user data container" even if the UE is in a restricted service area. The UE can send the UL NAS TRANSPORT message with the Payload type set to "CIoT user data container" if the RRC connection was established with the RRC establishment cause set to mo-ExceptionData.

If the UE in 5GMM-CONNECTED mode establish a PDU session for the purpose of exception data reporting, the UE should, even if the UE is in a restricted service area, send the PDU Session Establishment Request message in the UL NAS TRANSPORT message. If the maximum number of active user-plane resources is reached and the upper layers of the UE request user-plane resources for exception data reporting, the UE should (be allowed to) send a PDU Session Release Request message in the UL NAS TRANSPORT message to release a PDU session in order to establish another PDU session for exception data reporting.

If the UE is in 5GMM-IDLE mode, the UE is not allowed to initiate the service request procedure, or registration procedure for mobility and periodic registration update with Uplink data status IE, except if the UE needs to establish a PDU session for exception data reporting, or to request user-plane resource establishment for sending data for exception data reporting, or to send exception data reporting using the Control Plane Service Request message.

If the UE is in 5GMM-CONNECTED mode, the UE is not allowed to initiate the service request procedure, or a registration procedure for mobility and periodic registration update with Uplink data status IE, except if the UE needs to request user-plane resource establishment for sending data for exception data reporting.

If the UE is in 5GMM-IDLE mode with suspend indication, the UE should not request the lower layers to resume the connection except if the UE needs to send exception data for exception data reporting, or if the UE needs to send a PDU Session Establishment Request message for sending exception data for exception data reporting, or if the UE needs to release a PDU session (after the maximum number of active user-plane resources is reached and the upper layers of the UE request user-plane resources for exception data reporting) in order to establish another PDU session for exception data reporting.

The UE behavior for initiating NAS procedures when CIoT 5GS optimization is being used and the UE is in a restricted area is not defined thereby leaving the UE behavior unpredictable and possible incompatible with the network expectation. The present application proposes standardized UE behavior for the identified scenario such that a CIoT device can predictably operate when it is in a restricted service area.

Note that the proposals above also apply when the UE needs to send other data in the UL NAS TRANSPORT message, such as SMS or location service message or any other data that may be introduced in the future.

Note that the term "user data is related to an exceptional event" can also be interpreted to mean data for exception reporting.

FIG. 1 illustrates a flowchart illustrating setting of a UE behavior for initiating a NAS procedure according to an embodiment of the disclosure.

In particular, FIG. 1 illustrates a technique for determining whether to send data for a UE capable of operating in a certain mode (e.g., using control plane CIoT 5GS optimization).

Referring to FIG. 1, in a first operation 101, the UE determines if it is operating in a certain mode. For example, the UE may determine if it is using control plane CIoT 5GS optimization. If the UE is using control plane CIoT 5GS optimization, the flow proceeds to a next operation 102, otherwise the UE operates according to another mode.

In operation 102, the UE receives a request to send data over the control plane. For example, the request may come from upper layers and/or the data may be CIoT user data.

In a next operation 103, the UE performs a first check. For example, the UE may check if it is in a restricted service area. In certain examples, the UE may check if it is in a non-allowed area and/or if it is outside of an allowed area. The UE may decide whether or not to send the data based on a result of the first check. For example, if the UE is not in a restricted service area then the UE sends the data. On the other hand, if the UE is in a restricted service area then the flow proceeds to a next operation 104.

In operation 104, the UE performs a second check. For example, the UE may check if it is in a certain mode. In certain examples, the UE may check if it is in 5GMM-CONNECTED mode or in 5GMM-CONNECTED mode with RRC inactive indication. The UE may decide whether or not to send the data based on a result of the second check. For example, if the UE is in 5GMM-CONNECTED mode or in 5GMM-CONNECTED mode with RRC inactive indication then the UE sends the data, otherwise the UE does not send the data.

The skilled person will appreciate that the operations of FIG. 1 may be performed in a different order in alternative examples. In particular, the second check may be performed by the first check to achieve the same overall UE behavior in dependence on the results of the first and second checks.

Figure 2:
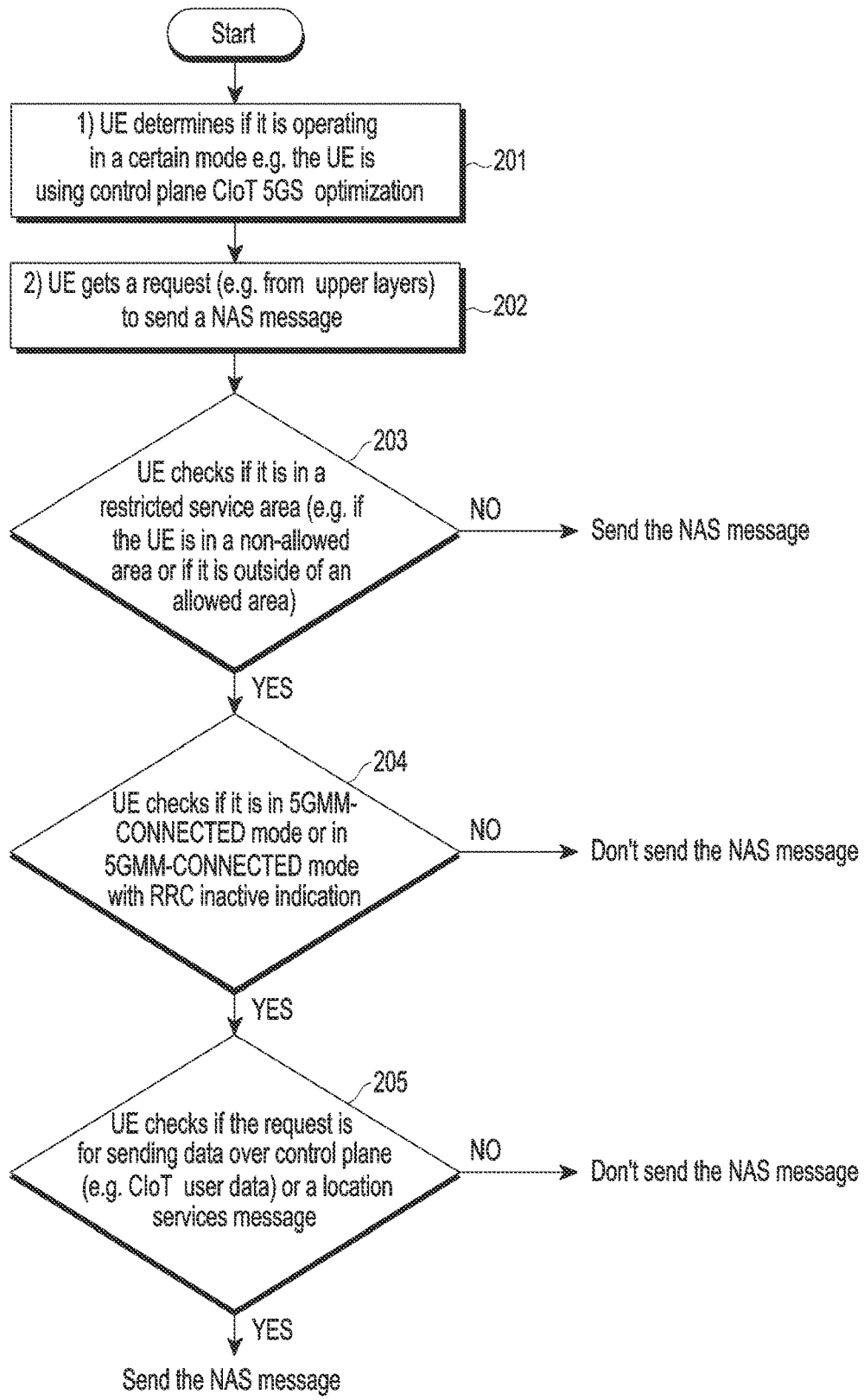
FIG. 2 is a flowchart illustrating setting of a UE behavior for initiating a NAS procedure according to an embodiment of the disclosure.

FIG. 2 illustrates a flowchart illustrating setting of a UE behavior for initiating a NAS procedure according to an embodiment of the disclosure.

In particular, FIG. 2 illustrates a technique for determining whether to send a NAS message for a UE capable of operating in a certain mode (e.g., using control plane CIoT 5GS optimization).

Referring to FIG. 2, in a first operation 201, the UE determines if it is operating in a certain mode. For example, the UE may determine if it is using control plane CIoT 5GS optimization. If the UE is using control plane CIoT 5GS optimization, the flow proceeds to a next operation 202, otherwise the UE operates according to another mode.

In operation 202, the UE receives a request to send a NAS message. For example, the request may come from upper layers.

In a next operation 203, the UE performs a first check. For example, the UE may check if it is in a restricted service area. In certain examples, the UE may check if it is in a non-allowed area and/or if it is outside of an allowed area. The UE may decide whether or not to send the NAS message based on a result of the first check. For example, if the UE is not in a restricted service area then the UE sends the NAS message. On the other hand, if the UE is in a restricted service area then the flow proceeds to a next operation 204.

In operation 204, the UE performs a second check. For example, the UE may check if it is in a certain mode. In certain examples, the UE may check if it is in 5GMM-CONNECTED mode or in 5GMM-CONNECTED mode with RRC inactive indication. The UE may decide whether or not to send the NAS message based on a result of the second check. For example, if the UE is not in 5GMM-CONNECTED mode or not in 5GMM-CONNECTED mode with RRC inactive indication then the UE does not send the NAS message, otherwise the flow proceeds to a next operation 205. In some embodiments, if the UE is not in 5GMM-CONNECTED mode or not in 5GMM-CONNECTED mode with RRC inactive indication then a further check may be applied, for example based on the type of data or content of the NAS message, to determine whether or not to send the NAS message. For example, if the UE is not in 5GMM-CONNECTED mode or not in 5GMM-CONNECTED mode with RRC inactive indication then the UE does not send the NAS message unless the data or content of the NAS message is of a certain type, for example SMS or LPP.

In operation 205, the UE performs a third check. For example, the UE may check if the request is for sending data over control plane (e.g., CIoT user data) or a location services message. The UE may decide whether or not to send the NAS message based on a result of the third check. For example, if the request is for sending data over control plane (e.g., CIoT user data) or a location services message then the UE sends the NAS message, otherwise the UE does not send the NAS message. In some embodiments, if the request is for sending neither data over control plane nor a location services message then a further check may be applied, for example based on the type of data or content of the NAS message, to determine whether or not to send the NAS message. For example, if the request is for sending neither data over control plane nor a location services message then the UE does not send the NAS message unless the data or content of the NAS message is of a certain type, for example SMS or LPP.

The skilled person will appreciate that the operations of FIG. 2 may be performed in a different order in alternative examples. In particular, the first to third checks may be performed in an alternative order to achieve the same overall UE behavior in dependence on the results of the first to third checks.

Figure 3:
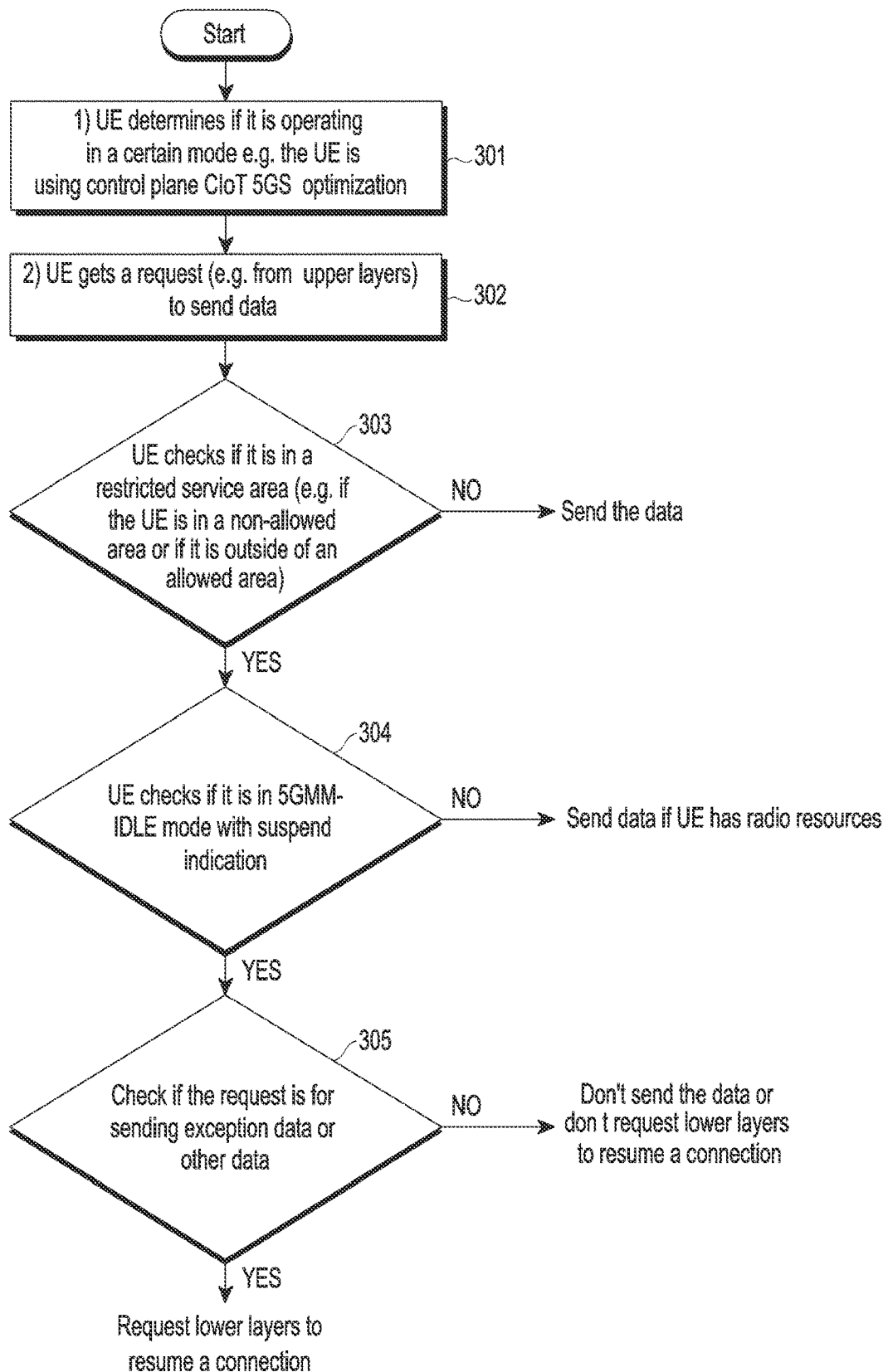
FIG. 3 is a flowchart illustrating setting of a UE behavior for initiating a NAS procedure according to an embodiment of the disclosure.

FIG. 3 illustrates a flowchart illustrating setting of a UE behavior for initiating a NAS procedure according to an embodiment of the disclosure.

In particular, FIG. 3 illustrates a technique for determining whether to send data and/or resume a connection for a UE capable of operating in a certain mode (e.g., using user plane CIoT 5GS optimization).

Referring to FIG. 3, in a first operation 301, the UE determines if it is operating in a certain mode. For example, the UE may determine if it is using user plane CIoT 5GS optimization. If the UE is using user plane CIoT 5GS optimization, the flow proceeds to a next operation 302, otherwise the UE operates according to another mode.

In operation 302, the UE receives a request to send data. For example, the request may come from upper layers.

In a next operation 303, the UE performs a first check. For example, the UE may check if it is in a restricted service area. In certain examples, the UE may check if it is in a non-allowed area and/or if it is outside of an allowed area. The UE may decide whether or not to request the lower layers to resume the RRC connection and/or whether or not to send data based on a result of the first check. For example, if the UE is not in a restricted service area then the UE requests the lower layers to resume the RRC connection and/or sends the data. On the other hand, if the UE is in a restricted service area then the flow proceeds to a next operation 304.

In operation 304, the UE performs a second check. For example, the UE may check if it is in a certain mode. In certain examples, the UE may check if it is in 5GMM-IDLE mode with suspend indication. The UE may decide whether or not to request the lower layers to resume the RRC connection and/or whether or not to send the data based on a result of the second check. For example, if the UE is not in 5GMM-IDLE mode with suspend indication then the UE sends the data if the UE has sufficient radio resources, and/or the UE requests the lower layers to resume the RRC connection (to send the data), otherwise the flow proceeds to a next operation 305.

In operation 305, the UE performs a third check. For example, the UE may check if the request is for sending exception data or other data. The UE may decide whether or not to request lower layers to resume a suspended connection and send the data based on a result of the third check. For example, if the request is for sending exception data then the UE requests lower layers to resume the suspended connection and sends the data. On the other hand, if the request is for sending other data then the UE does not request lower layers to resume the suspended connection and does not send the data.

The skilled person will appreciate that the operations of FIG. 3 may be performed in a different order in alternative examples. In particular, the first to third checks may be performed in an alternative order to achieve the same overall UE behavior in dependence on the results of the first to third checks.

The skilled person will appreciate that a request to send data is one example of an operation in which a NAS procedure may need to be initiated. For example, in FIGS. 1-3 and related description, a request to send data may result in the sending of a NAS message by initiating a NAS transport procedure in which the UE sends the UL NAS TRANSPORT message.

Figure 4:
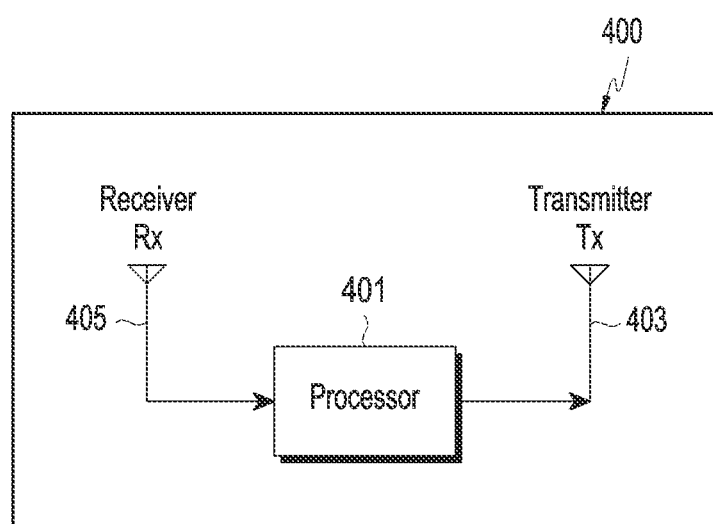
FIG. 4 is a block diagram of a network entity according to an embodiment of the disclosure.

FIG. 4 is a block diagram of a network entity according to an embodiment of the disclosure.

The skilled person will appreciate that a network entity may be implemented, for example, as a network element on a dedicated hardware, as a software instance running on a dedicated hardware, and/or as a virtualized function instantiated on an appropriate platform, e.g., on a cloud infrastructure.

Referring to FIG. 4, an entity or UE 400 comprises a processor (or controller) 401, a transmitter 403 and a receiver 405. The receiver 105 is configured for receiving one or more messages from one or more other network entities, for example as described above. The transmitter 403 is configured for transmitting one or more messages to one or more other network entities, for example as described above. The processor 401 is configured for performing one or more operations, for example according to the operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method operations for implementing the techniques described herein. For example, an operation/function of X may be performed by a module configured to perform X (or an X-module). The one or more elements may be implemented in the form of hardware, software, or any combination of hardware and software.

It will be appreciated that examples of the disclosure may be implemented in the form of hardware, software or any combination of hardware and software. Any such software may be stored in the form of volatile or non-volatile storage, for example a storage device like a read only memory (ROM), whether erasable or rewritable or not, or in the form of memory, such as, for example, RAM, memory chips, device or integrated circuits or on an optically or magnetically readable medium, such as, for example, a compact disc (CD), digital versatile disc (DVD), magnetic disk or magnetic tape or the like.

It will be appreciated that the storage devices and storage media are embodiments of machine-readable storage that are suitable for storing a program or programs comprising instructions that, when executed, implement certain examples of the disclosure. Accordingly, certain example provides a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method of a user equipment (UE) in a wireless communication system, the method comprising:
   identifying that the UE is in a restricted service area; and
   in case that the UE is in 5GS mobility management (5GMM) connected mode or 5GMM connected mode with radio resource control (RRC) inactive indication over $3^{rd}$ generation partnership project (3GPP) access, performing a non-access stratum (NAS) transport procedure to send an uplink NAS transport message including a cellular internet of things (CIoT) user data container.

2. The method of claim 1, wherein it is identified that the UE is in a restricted service area, in case that a tracking area for the UE is a tracking area that is set to non-allowed tracking area in service area list information or a tracking area for the UE is not a tracking area that is set to allowed tracking area in service area list information.

3. The method of claim 1, further comprising:
   in case that the UE is in 5GMM idle mode with suspend indication over 3GPP access, requesting lower layers to resume a suspended connection for performing one or more predefined types of operation.

4. The method of claim 3, wherein the one or more predefined types of operation comprises transmitting an uplink NAS transport message comprising one or more predefined types of data.

5. The method of claim 3, wherein the one or more predefined types of operation comprise one or more of:
   transmitting short message service (SMS); and
   transmitting a location service message.

6. The method of claim 3, wherein the one or more predefined types of operation comprise one or more of:
   responding to notification received over non-3GPP access;
   transmitting a steering of roaming (SOR) transport container;
   transmitting a UE policy container; and
   transmitting a UE parameters update transport container.

7. The method of claim 1, wherein the uplink NAS transport message further comprises at least one of:
   an SOR transport container;
   a UE policy container; and
   a UE parameters update transport container.

8. The method of claim 1, further comprising:
   in case that the UE is in 5GMM connected mode with RRC inactive indication over 3GPP access, requesting lower layers to resume a suspended connection for performing one or more predefined types of operation.

9. The method of claim 8, wherein the one or more predefined types of operation comprise one or more of:
   emergency services;
   high priority access; or
   responding to paging or responding to notification received over non-3GPP access.

10. The method of claim 1, further comprising:
    in case that the UE is in 5GMM-connected mode or in 5GMM-connected mode with RRC inactive indication, transmitting an uplink NAS transport message with a payload type set to a type of the CIoT user data container,
    when the UE receives a downlink NAS transport message with the payload type set to a type of the CIoT user data container.

11. The method of claim 1, further comprising:
    in case that the UE is transitioned to 5GMM-connected mode with a service request message, or a registration request message, in response to paging,
    transmitting an uplink NAS transport message with a payload type set to a type of the CIoT user data container.

12. The method of claim 1, further comprising:
    in case that the UE is in 5GMM-connected mode and NB-N1 mode, and
    the UE needs to send CIoT user data for exception data reporting,
    transmitting an uplink NAS transport message with a payload type set to a type of CIoT user data container.

13. The method of claim 1, further comprising:
    in case that the UE is in 5GMM-connected mode and NB-N1 mode, and
    the RRC connection was established with the RRC establishment cause set to mo-ExceptionData,
    transmitting an uplink NAS transport message with a payload type set to a type of the CIoT user data container.

14. The method of claim 1, further comprising:
    in case that the UE is in 5GMM-connected mode, and
    the UE establishes a protocol data unit (PDU) session for exception data reporting,
    transmitting a PDU session establishment request message in an uplink NAS transport message.

15. The method of claim 14, further comprising:
    in case that a maximum number of active user-plane resources is reached and upper layers of the UE request user-plane resources for exception data reporting,
    transmitting a PDU session release request message in an uplink NAS transport message to release a PDU session in order to establish another PDU session for exception data reporting.

16. The method of claim 1, further comprising:
    in case that the UE is in 5GMM idle mode,
    initiating a service request procedure, when the UE needs to establish a PDU session for exception data reporting, or to request user-plane resource establishment, transmitting data for exception data reporting, or transmitting exception data reporting using the control plane service request message.

17. The method of claim 1, further comprising:
    in case that the UE is in 5GMM-connected mode,
    initiating a service request procedure, when the UE needs to request user-plane resource establishment, or transmitting data for exception data reporting.

18. The method of claim 1, further comprising:
    in case that the UE is in 5GMM idle mode with suspend indication:
    requesting lower layers to resume the connection, when the UE needs to transmit data for exception data reporting or when the UE needs to transmit a PDU session establishment request message, transmitting data for exception data reporting, or
    when the UE needs to release a PDU session in order to establish another PDU session, transmitting exception data reporting.

19. A user equipment (UE) in a wireless communication system, the UE comprising:
a transceiver; and
at least one processor coupled with the transceiver and configured to:
identify that the UE is in a restricted service area, and
in case that the mode of the UE is 5GS mobility management (5GMM) connected mode or 5GMM connected mode with radio resource control (RRC) inactive indication over $3^{rd}$ generation partnership project (3GPP) access, perform a non-access stratum (NAS) transport procedure to send a transport of an uplink NAS transport message including a cellular internet of things (CIoT) user data container.

20. The UE of claim 19, wherein it is identified that the UE is in a restricted service area, in case that a tracking area for the UE is a tracking area that is set to non-allowed tracking area in service area list information or a tracking area for the UE is not a tracking area that is set to allowed tracking area in service area list information.

* * * * *